US008669985B2

(12) United States Patent
Clement et al.

(10) Patent No.: US 8,669,985 B2
(45) Date of Patent: Mar. 11, 2014

(54) ASSESSMENT RESULTS VIEWER

(75) Inventors: George Clement, Bothell, WA (US); Aman Benes, Seattle, WA (US); Jason Thorsness, Renton, WA (US); Robert Greenwell, Fall City, WA (US); William Gifford Holt, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 524 days.

(21) Appl. No.: 12/973,887

(22) Filed: Dec. 20, 2010

(65) Prior Publication Data
US 2012/0154404 A1 Jun. 21, 2012

(51) Int. Cl.
*G06T 11/20* (2006.01)
*G06F 3/0481* (2013.01)
*G06F 17/24* (2006.01)

(52) U.S. Cl.
CPC .............. *G06T 11/206* (2013.01); *G06F 3/0481* (2013.01); *G06F 17/246* (2013.01)
USPC ........................................ 345/440; 345/440.2

(58) Field of Classification Search
USPC ............... 345/440, 173, 440.2; 715/736, 764, 715/771, 783
See application file for complete search history.

(56) References Cited

U.S. PATENT DOCUMENTS

| | | | |
|---|---|---|---|
| 2005/0154628 A1 | 7/2005 | Eckart et al. | |
| 2005/0204214 A1* | 9/2005 | Welch | 714/712 |
| 2006/0259629 A1* | 11/2006 | Usmani et al. | 345/173 |
| 2007/0186283 A1 | 8/2007 | Brumbaugh et al. | |
| 2007/0288861 A1* | 12/2007 | Tabellion et al. | 715/783 |
| 2011/0307322 A1* | 12/2011 | Hsiao et al. | 715/764 |
| 2012/0022700 A1* | 1/2012 | Drees et al. | 715/771 |
| 2012/0221955 A1* | 8/2012 | Raleigh et al. | 715/736 |
| 2012/0327816 A1* | 12/2012 | Morrill et al. | 370/259 |
| 2013/0018836 A1* | 1/2013 | Hofstaedter et al. | 706/47 |

OTHER PUBLICATIONS

Harish, "Report Generation in .Net", Retrieved at << http://www.c-sharpcorner.com/uploadfile/harishps/reportsindotnet11082005233222pm/reportsindotnetaspx >>,Feb. 27, 2004, pp. 1-8.

Vesanto et al., "An Automated Report Generation Tool for the Data Understanding Phase", Retrieved at << http://www.cis.hut.fi/jhollmen/Publications/raip-ch8-draft.pdf >>,Dec. 12, 2001, pp. 18.

(Continued)

*Primary Examiner* — Chante Harrison
(74) *Attorney, Agent, or Firm* — Andy Sanders; Raghu Chinagudabha; Micky Minhas

(57) ABSTRACT

An assessment results viewer displays the results of assessments that quantify the performance of an aspect of a computing device. The viewer presents both an overview of the collected data and mechanisms for displaying ever-increasing details, including raw data itself. The viewer further provides actionable information to the user that can offer the user guidance, or otherwise suggest potential courses of action. The viewer automatically aggregates multiple iterations of the same assessment to generate derivative overview data, and automatically aligns data collected by the same assessment across multiple job files. Such aggregation and alignment is performed by reference to metadata, including identifying information. Data can be presented in tabular form, and users can pivot along different axis to focus on groupings of data.

20 Claims, 3 Drawing Sheets

(56) References Cited

OTHER PUBLICATIONS

Joab et al., "A Knowledge-Based Generator for after Action Review Interactive Documents", Retrieved at << http://hal.archives-ouvertes.fr/docs/00/10/88/18/PDF/D388.PDF >>, 2004, pp. 6.

Viedma et al., "Applying Aggregation Operators for Information Access Systems: An Application in Digital Libraries", Retrieved at << http://sci2s.ugr.es/publications/ficheros/2008-viedma-IJIS.pdf >>, Dec. 2008, pp. 16.

Jauhari, Nikesh, "Ratproxy—A Passive Web Application Security Assessment Tool", Retrieved at << http://linuxpoison.blogspot.com/2010/01 >>, Jan. 2010, pp. 1-3.

"Report Generator Graph Reports", Retrieved at << http://www.isograph-software.com/rpgovergrr.htm >>, Retrieved Date: Sep. 14, 2010, p. 1.

"LabVIEW Report Generation Toolkit for Microsoft Office", Retrieved at << http://www.ni.com/pdf/labview/us/report_generation_toolkit.pdf >>,—Retrieved Date: Sep. 14, 2010, pp. 19.

* cited by examiner

ASSESSMENT RESULTS VIEWER

BACKGROUND

Users, manufacturers and resellers of computing devices often desire to analyze the performance of a computing device. For example, manufacturers can desire to analyze the performance of computing devices, prior to being shipped from the manufacturing facility, to detect anomalies that can signify manufacturing errors, or that can differentiate higher performance components from lower performance components, thereby enabling the manufacturer to charge a higher price for the higher performance components. Similarly, resellers of computing devices can desire to analyze their performance as part of a sales effort, such as advertising or marketing to potential consumers. Users of computing devices may have multiple reasons for desiring to analyze the performance of their computing devices. For example, enthusiast users may seek to optimize the performance of their computing device, and may exchange performance analysis data among other like-minded enthusiast users. As another example, users may seek to analyze the performance of their computing devices to detect problems or to quantify issues that the user may be experiencing so that those issues can be analyzed further, such as by dedicated technical support professionals.

Traditionally, the performance of a computing device has been quantified by independent performance measurement application programs that execute a pre-defined suite, and often a standardized suite, of performance quantifying tasks. The results are typically presented in the form of numerical data that is often standardized by reference to a well known computing device or component. However, most users may not have ever had any experience with the device or component to which the results are standardized and, consequently, the returned results have no meaning to such users. And while users may be able to compare results with one another at a high level, such as by e-mailing the numerical values reported by their performance measurement application programs, there is no mechanism by which a comparison between multiple computing devices that focuses on the raw, underlying data can be made. Additionally, many standardized suites of performance quantifying tasks may focus only the hardware of a computing device and, consequently, may never detect software anomalies. For example, a computing device with one or more corrupted, or incompatible, data files may be perceived by a user to start up slowly even if a standardized suite of performance quantifying tasks indicates that the hardware of such a computing device is operating properly.

SUMMARY

In one embodiment, an assessment results viewer can analyze raw data collected by an assessment, and can present, to a user, an overview of such collected data. The collected data can comprise both performance data and health data that can inform a user of a component that is experiencing difficulty. The assessment results viewer can further enable a user to drill down and obtain ever-increasing details, including the raw data itself.

In another embodiment, the assessment results viewer can further provide actionable information to the user that can offer the user guidance, or otherwise suggest potential courses of action to either ameliorate a detected problem, or learn more about the collected data. The assessment results viewer can reference benchmark targets in determining whether to provide actionable information. Such benchmark targets can be pre-determined or dynamically established, including by the assessment results viewer itself. Additionally, the assessment results viewer can indicate whether the collected data passes or fails the respective benchmark thresholds.

In a further embodiment, the assessment results viewer can compare the raw data collected by multiple assessments that either quantified the performance aspect of a single computing device at multiple instances, or that quantified the performance aspect of multiple computing devices. Such a comparison can be presented both numerically and graphically. As part of such a comparison, multiple iterations of the same assessment can be automatically aggregated and data collected by the same assessment across multiple instances of its execution on a single computing device, or across multiple computing devices, can be automatically aligned to enable easier comparison.

In a still further embodiment, the assessment results viewer can integrate with existing analysis tools to enable a user to further diagnose or learn more about an issue identified by an assessment.

In a yet further embodiment, the assessment results viewer can enable a user to establish their own groupings, such as by grouping the data collected by assessments dedicated to a particular aspect of the computing device, or across multiple computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
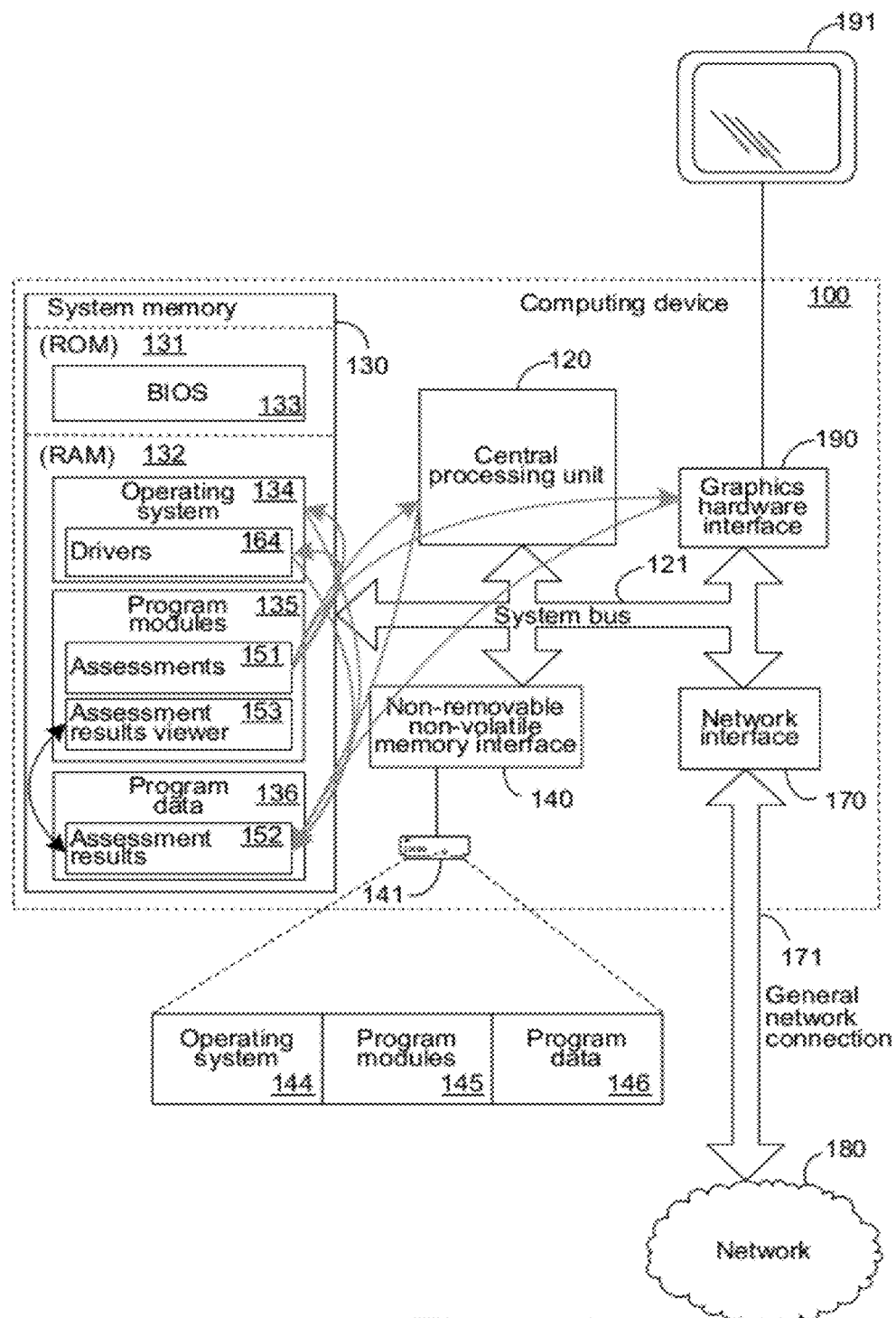
FIG. 1 is a block diagram illustrating an exemplary computing device.

The following description relates to the display of the results of one or more assessments that quantify the performance of an aspect of a computing device. An assessment can be a collection of computer-executable instructions that execute to collect data representing a quantifiable evaluation of an aspect of the computing device. Each assessment can store the data it collects into a file that can further include information to aid in the display of such data. An assessment results viewer can analyze the data collected by assessments and can present both an overview of such collected data and mechanisms for displaying ever-increasing details, including the raw data itself. As part of the presentation of collected data, the assessment results viewer can reference benchmarks, including both per-determined benchmarks and dynamically determined benchmarks, and indicate whether the collected data passed or failed those benchmarks. The assessment results viewer can further provide actionable information to the user that can offer the user guidance, or otherwise suggest potential courses of action to either ameliorate a detected problem, or learn more about the collected data. Such guidance can be offered through integration with existing analysis tools. Additionally, the assessment results viewer can compare the raw data collected by multiple assessments and can display the results of such a comparison both numerically and graphically. As part of the presentation of collected data, the assessment results viewer can automatically aggregate multiple iterations of the same assessment, and can automatically compare data collected by the same assessment across multiple instances of its execution on a single computing device, or across multiple computing devices, as well as enabling users to establish their own groupings, such as by grouping the data collected by assessments dedicated to a particular aspect of the computing device, or across multiple computing devices.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136, each of which comprise other data and modules that will be referenced further in the descriptions below.

The computing device 100 may also include other removable/non-removable, volatile/nonvolatile computer storage media. By way of example only, FIG. 1 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. For example, the computing device 100 is shown in FIG. 1 to be connected to a network 180 via a general network connection 171 that can be a local area network (LAN), a wide area network (WAN) or other network connection. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

For purposes of providing context to the descriptions below, the program modules 135 are shown as comprising one or more assessments 151 and an assessment results viewer 153. As indicated previously, each assessment can comprise computer-executable instructions that, when executed, collect data to quantify a performance of one or more aspects of the computing device 100. Thus, as illustrated by the gray shaded lines and arrows shown in FIG. 1, one or more of the assessments 151 can, when executed, collect data to quantify the performance of, for example, the operating system 134, various drivers 164, the central processing unit 120, graphics hardware 190, and other aspects of the computing device 100. Assessments, such as the assessments 151, can differ from traditional computing performance metrics. For example, while traditional computing performance metrics can quantify the performance of, for example, the central processing unit 120 of a computing device 100, traditional computing performance metrics typically do not quantify the execution of computer-executable instructions that comprise the operating system 134 or other program modules 135. Assessments, on the other hand, can likewise seek to quantify the performance of such computer-executable instructions. For example, one of the assessments 151 can quantify the performance of the operating system 134 by measuring how quickly the operating system 134 boots on the computing device 100, or otherwise proceeds from an inactive state to a state in which it can accept user input. Similarly, assessments, such as one of the assessments 151, can quantify the performance of aspects of the operating system 134, such as the drivers 164. As will be known by those skilled in the art, the drivers 164 can comprise computer-executable instructions that can enable the operating system 134 to interoperate with physical components of the computing device 100, or components which are otherwise communicationally coupled with the computing device 100, including, for example, printers, scanners, keyboards, and other like physical components. To quantify the performance of the drivers 164, for example, one of the assessments 151 can measure how quickly such drivers are loaded, or can measure the memory usage of the drivers, or any other quantifiable aspect of the drivers.

The data collected by the assessments 151 can, as also indicated by the gray lines and arrows of FIG. 1, be stored in the assessment results 152, which can be considered to be part of the previously described program data 136. In one embodiment, such assessment results 152 can be in the form of data files conforming to an extensible markup language such that the assessment results 152 can comprise both raw data, and metadata that can be utilized to further understand the raw data. The precise manner in which the data collected by the assessments 151 is stored in the assessment results 152 can be controlled by an author of the assessments 151. Such an author can likewise dictate what additional information, or metadata, the assessment results 152 comprise.

Often, a given assessment, such as one of the assessments 151, can be executed with reference to one or more parameters that can be modified. For example, an assessment directed to the ability of the computing device 100 to read from, and write to, the RAM 132 can reference parameters directed to the size of the data chunks that are utilized for the reading and writing tests. In such an example, the computer executable instructions of the assessment can remain the same, but with the changing of the parameters referenced by the assessment, different aspects of the performance of the computing device 100 can be quantified.

To collect data assessments can often be executed hundreds of times, including multiple iterations with the same parameters, and with differing parameters. For purposes of the descriptions below, the term "iterations" will be utilized to reference the execution of the computer executable instructions of an assessment, irrespective of whether those computer executable instructions utilize the same parameters, or different parameters, from a prior execution. Thus, for purposes of the descriptions below, explicit reference will be made as to whether the described iterations are iterations of an assessment utilizing the same parameters, or iterations of an assessment where each iteration utilizes a different set of parameters.

The execution of assessments can be grouped into one or more jobs of assessments. For example, one job can comprise multiple assessments directed to the ability of the computing device 100 to read from, and write to, the RAM 132, the hard disk drive 141, and other computer-readable storage media communicationally coupled with the computing device 100. The assessment results 152 can be saved as files, where each file comprises the assessment results for the assessments executed as part of a single job. The assessment results viewer 153, therefore, can open one or more files of assessment results 152, as illustrated by the black double-headed arrow shown in FIG. 1. However, because each assessment job file can comprise data from potentially hundreds of different assessments, the assessment results viewer 153 can perform processing to present such data, such as to a user of the computing device 100, in a manner that is more easily understood, enables such a user to diagnose problems or obtain further information, and which enables comparison between multiple assessment job files, including assessment job files whose data was collected from the computing device 100 at different times, and assessment job files whose data was collected from other computing devices, such as computing devices from which the computing device 100 can obtain the assessment job files via the network 180.

Figure 2:
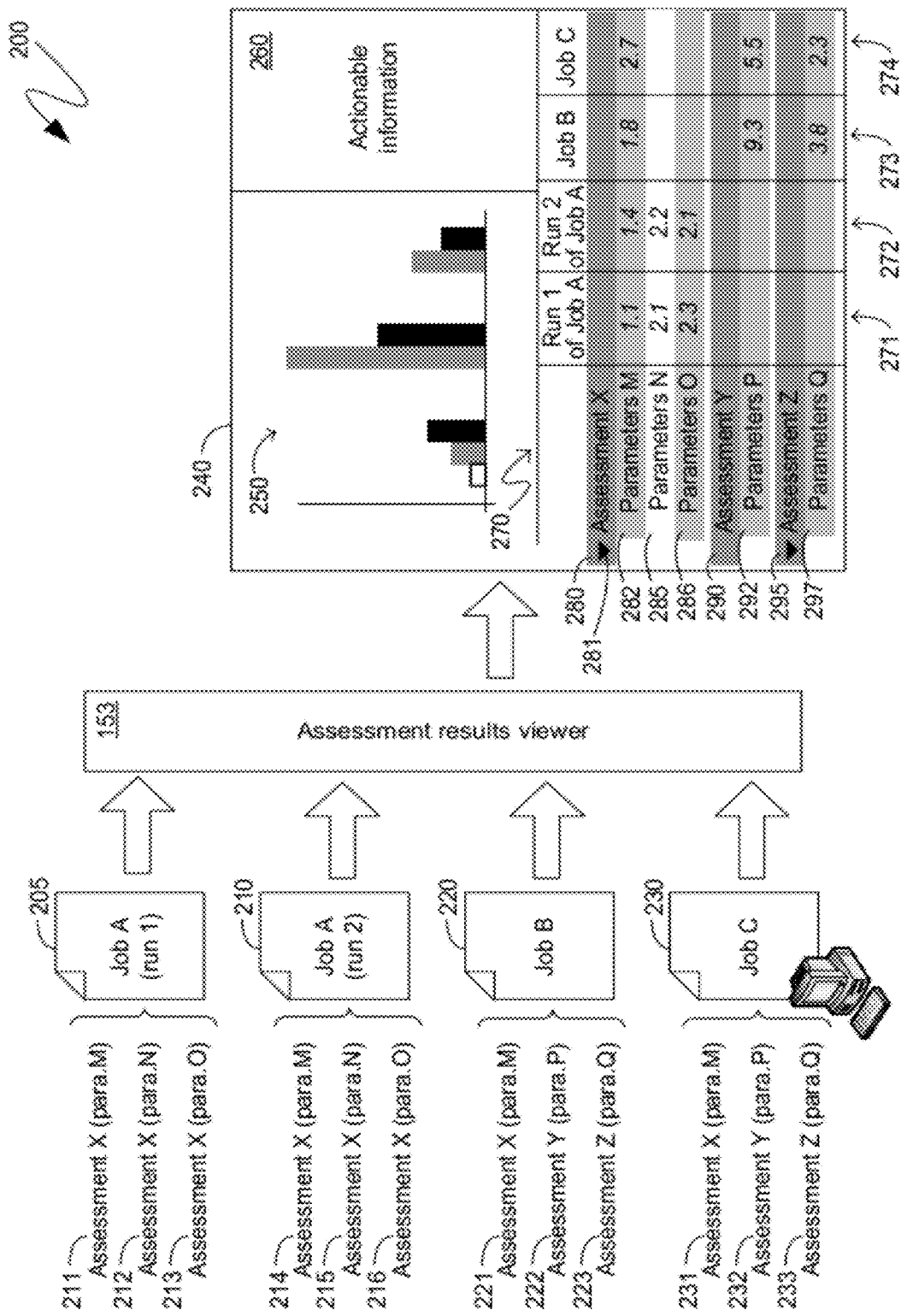
FIG. 2 is a block diagram illustrating an exemplary operation of an assessment viewer.

Turning to FIG. 2, the system 200 shown therein illustrates an exemplary mechanism by which the assessment results viewer 153 can provide the above-indicated functionality. For purposes of illustration, four job files, comprising the data collected by the assessments that were executed as part of those job files, are shown in the system 200 of FIG. 2 as being consumed by the assessment viewer 153. The four exemplary job files, namely the job files 205, 210, 220 and 230, respectively, are each shown as comprising the data collected by multiple different iterations of assessments. Additionally, the job files 205, 210 and 220 are meant to represent job files that can have been local to the computing device 100, and can represent data collected by assessments executed locally on the computing device 100, while the job file 230 is meant to illustrate a job file that can have been executed on a computing device remote from the computing device 100.

For purposes of illustration, the job files 205 and 210 are shown to comprise two different iterations of the same group of assessments. Iterations 211, 212 and 213 can be repeated iterations of iterations 214, 215 and 216. By contrast, the job files 220 and 230 are shown, again for purposes of illustration, as comprising iterations of differing assessments and differing parameters for each of those assessments. Thus, for example, the job file 220 is shown as comprising an iteration 221 of one assessment, an iteration 222 of a different assessment, and an iteration 223 of a still different assessment. Likewise for the job file 230 in the iterations 231, 232 and 233 illustrated as being part of that job file. For purposes of illustration, however, the iteration 221 associated with the job file 220 can be equivalent to the iteration 231 associated with the job file 230. Likewise, the iteration 222 associated with the job file 220 can be equivalent to the iteration 232 associated with the job file 230, and the iteration 223 can be equivalent to the iteration 233.

In one embodiment, the assessment results viewer 153 can present an interface 240 analogous to that illustrated in the system 200 of FIG. 2. The interface 240 can comprise a graphical visualization area 250 in which the assessment results viewer 153 can represent data in a graphical form, such as through bar charts, line charts, or other mechanisms by which quantitative data is visualized. The interface 240 can also comprise an actionable information area 260 in which the assessment results viewer 153 can present actionable information to a user. As utilized herein the term "actionable information" means any information that either provides guidance as to how a detected sub-optimal condition can be ameliorated or that provides information regarding the detected sub-optimal condition. Thus, the actionable information area 260 can comprise information that can guide the user through a series of steps, or that can simply enumerate the steps, that a user could take to ameliorate a detected sub-optimal condition. Alternatively, if there is no known amelioration for any detected sub-optimal condition, the actionable information area 260 can comprise further information regarding the detected sub-optimal condition.

The exemplary interface 240, that can be presented by an assessment results viewer 153, can further comprise a tabular presentation of data area 270 that can comprise the presentation of the data from one or more job files, such as the job files 205, 210, 220 and 230, in a tabular form to ease comparisons of the data from the various job files and to enable a user to focus on either summary data, or more detailed data. For example, the tabular presentation of data area 270 can comprise four columns for each of the four job files, with column 271 corresponding to the job file 205, column 272 corresponding to the job file 210, column 273 corresponding to the job file 220 and column 274 corresponding to the job file 240. The rows of the tabular presentation of data area 270 can correspond to the various assessments that collected the data that is in the job files accessed by the assessment results viewer 153. For example, the row 280 can correspond to one assessment, while the row 290 and the row 296 can correspond to other assessments. Various sub-rows, such as the sub-rows 282, 285, 286, 292 and 297 can correspond to specific iterations of those assessments with specific parameters.

In one embodiment, the assessment results viewer 153 can construct derivative rows whose values are derived from the raw data values. For example, as illustrated in the system 200 of FIG. 2, the job files 205 and 210 can comprise data collected by multiple iterations of an assessment with the same set of parameters. That exemplary data can be shown in the tabular presentation of data area 270 as the collection of rows 282, 285 and 286. In one embodiment, for purposes of comparing such data to the data of other job files, the individual data collected by each iteration can be aggregated by the assessment results viewer 153. The assessment results viewer 153 can select from an appropriate aggregation mechanism depending upon the data that is being aggregated. For example, if the data that is being aggregated comprises textual string values, the assessment results viewer 153 can aggregate those strings by, for example, identifying the most frequently occurring string or concatenating multiple strings together. Similarly, if the data that is being aggregated comprises Boolean values, the assessment results viewer 153 can aggregate those Boolean values by, for example, applying an AND function to each of the Boolean values. Numerical values, in addition to being aggregated by selecting a median value, can also be aggregated, by the assessment results viewer 153, by summing the values, calculating an average value, and other like numerical functions. Consequently, as utilized herein, the term "aggregation" means derivative data derived as a representation of a collection of multiple sets of data. Typically, the derivation of an aggregate value can enable easier comparison as between iterations of assessments that differ, either in the time when they were run, or in the computing device on which they were run.

In one embodiment, the exemplary interface 240 can comprise mechanisms by which the user can either view only abstracted data, or can be provided with further details, at the user's choice. For example, data regarding the iterations that is displayed in the rows 282, 285 and 286 can no longer be displayed if the user were to, for example, toggle the display triangle 281 in a manner well known to those skilled in the art.

To further ease comparisons of assessments between job files, the assessment results viewer 153 can present the assessments in an order different from that in the job files themselves. For example, a particular assessment may have been executed first as part of one job, but it may have been executed last as part of another job. However, to ease comparisons of those two assessments, the data obtained by both assessments should be presented side-by-side when comparing the two job files. Consequently, in one embodiment, the assessment results viewer 153 can de-serialize the various iterations of assessments in a job file and then seek to present the data acquired by those iterations in an order that enables comparisons of the assessments between job files. As utilized herein, the term "de-serialize" means the examining of each entry, in this case the data collected by one iteration of one assessment, independently of other entries.

Once the results have been de-serialized, the assessment results viewer 153 can further seek to identify iterations of assessments that are equivalent as between job files. In identifying such equivalent iterations, the assessment results viewer 153 can first seek to determine whether the assessment itself is the same assessment, such as by referencing assessment identification information and assessment version information. For example, an assessment having the same identifier, but having a version number less than that of another assessment in another job file may not necessarily be considered to be equivalent. Once the assessment results viewer 153 has identified equivalent assessments, it can proceed to determine whether those equivalent assessments were executed with reference to an equivalent set of parameters. If two or more job files comprise equivalent assessments that were executed with reference to an equivalent set of parameters, then the assessment results viewer 153 can determine that the data collected by those iterations is comparable as between job files, and the assessment results viewer 153 can display the data in such a manner, such as, for example, by including such data within a single row in the tabular presentation of data area 270. For example, even if the iterations 221 and 231 were performed last, and the collected data was stored at the end of the job files 220 and 230, respectively, the assessment results viewer 153 could de-serialize those results and display them as part of the row 282, prior to the display of the results of the iterations 222 and 232, and the iterations 223 and 233, whose results are displayed in the rows 292 and 297, respectively, even though such a display order is counter to the order in which the data was stored in the job files, because such a display order can simplify the comparison of, for example, the data shown in the row 283.

Other metadata available in the job files can likewise be referenced, by the assessment results viewer 153, to identify comparable data as between multiple job files. In one embodiment, the assessment results viewer 153 can determine that assessments are comparable due to their relative relationship to other assessments within their respective job files. For example, if two job files comprise a sequence of assessments ordered in an identical manner, the two job files may be considered to be comparable, and each assessment within the job file can be considered to be equivalent to its corresponding assessment in the other job file, even though there may be, for example, version differences between the assessments.

In one embodiment, metadata that can be contained in job files can comprise benchmarks against which the collected data is to be compared. In such an embodiment, rather than displaying numerical values, the assessment results viewer 153 can, instead, display indications of how the collected data compares to the relevant benchmarks. For example, the assessment results viewer could display "pass" or "fail" messages depending on whether the collected data was above or below the relevant benchmarks. Additionally, as another example, the assessment results viewer could display a "warning" indicator for situations where collected data may have been close to a benchmark.

The benchmark metadata can comprise both pre-determined benchmarks and dynamically determined benchmarks. Pre-determined benchmarks can be established by an assessment author and can, for example, be specifically defined prior to the collection of any data by the assessment. Dynamically determined benchmarks, on the other hand, can be established as part of the collection of data by the assessment and, thus, can vary depending upon the data that was collected by the assessment.

In one embodiment, as indicated previously, the assessment results viewer 153 can aggregate information collected by one or more assessments to facilitate comparisons across multiple iterations of those assessments, either at different times on the same computing device, or across different computing devices. In such an embodiment, the assessments results viewer 153 can likewise aggregate the relevant benchmarks. Thus, for example, if the aggregated information can comprise the determination of a median value, then aggregation of the relevant benchmarks can likewise comprise the determination of the median benchmark value.

Reference to such benchmarks can inform the presentation of the actionable information 260 described above. For example, data collected by assessments that fail to meet certain benchmarks, or threshold values, can trigger the presentation of actionable information 260 to either provide the user with further information regarding such a failure to meet a threshold, or to provide the user with potentially ameliorating actions to avoid such a sub-optimal condition in the future. In one embodiment, the assessment results viewer 153 can integrate with existing analysis tools to enable those analysis tools to access the raw data of the assessments, or the aggregated data generated by the assessment results viewer 153, and provide further feedback and guidance to a user. Such integration between the assessment results viewer 153 and existing analysis tools can be in accordance with one or more data exchange protocols to which both the assessment results viewer 153 and the existing analysis tools can conform.

As indicated previously, an assessment can be a collection of computer-executable instructions that can execute to collect data representing a quantifiable evaluation of an aspect of the computing device. As such, an assessment can collect performance data of one or more components of a computing device, such as can be numerically expressed, and such as was shown in the exemplary interface 240 shown in the system 200 of FIG. 2. However, assessments can likewise comprise "health" assessments that can be directed to detecting currently existing, or potential, problems or sub-optimal conditions in one or more components of a computing device. Such health assessments need not provide numerical data and can, instead, simply indicate the presence of conditions that can signal a failure, or other sub-optimal condition. For ease of reference, the term "performance", as utilized herein within the context of assessment data is meant to include both numerical performance data and health performance data.

Figure 3:
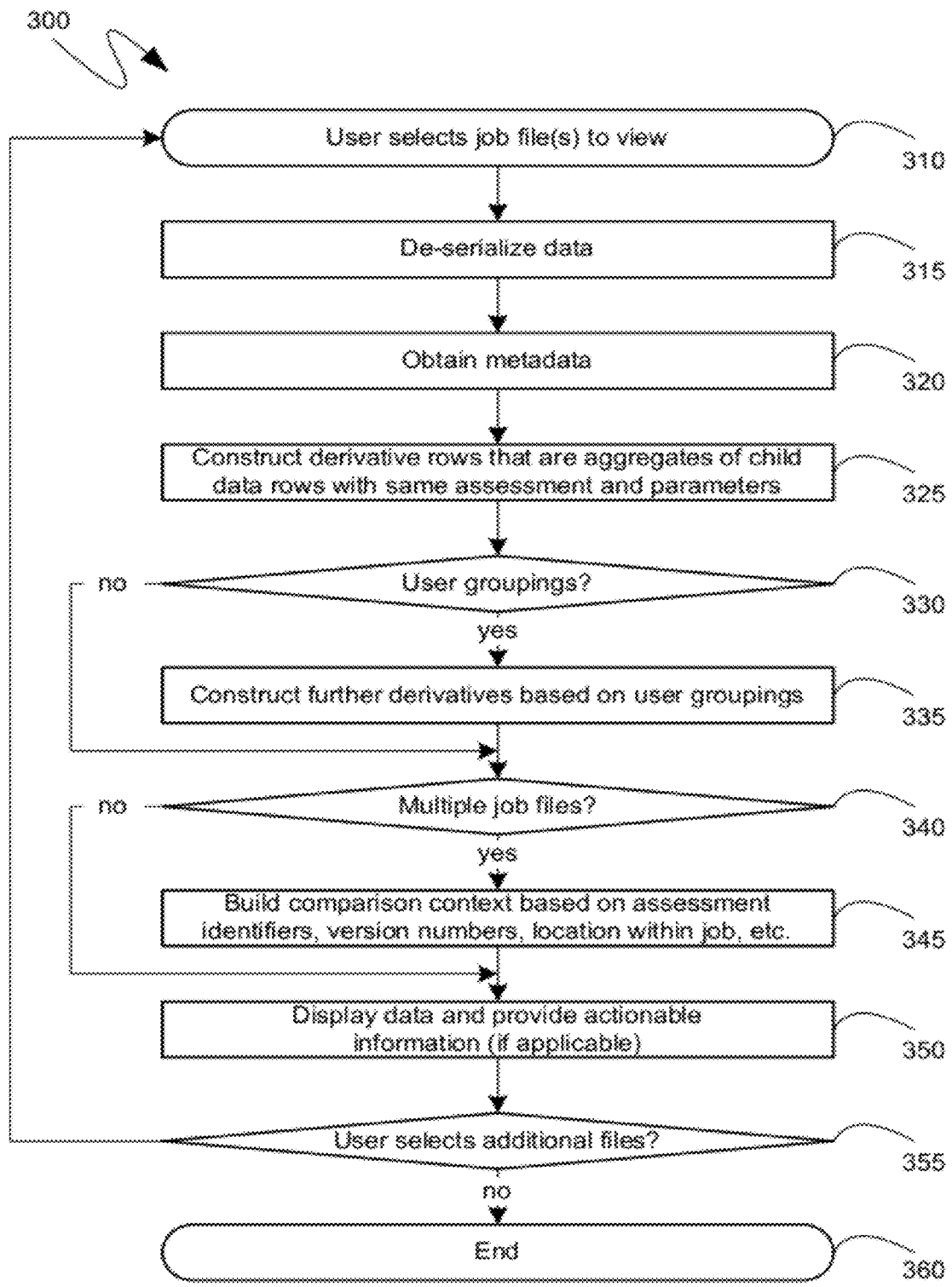
FIG. 3 is a flow diagram of an exemplary operation of an assessment viewer.

Turning to FIG. 3, the flow diagram 300 shown therein illustrates an exemplary series of steps that can be performed by an exemplary assessment results viewer, such as the assessment results viewer 153 shown in FIG. 2. Initially, as shown by the flow diagram 300 of FIG. 3, one or more job files can be selected to be displayed by the assessment results viewer at step 310. Subsequently, at step 315, individual iterations of assessments within the job file, or files, that were selected at step 310 can be de-serialized and processed in an independent manner. For each of the individual iterations of assessments that were de-serialized at step 315, metadata from the job file, or files, can be obtained at step 320. Such metadata can comprise information regarding the version number of the assessment that collected the data, the parameters that were utilized in collecting the data, target values or other qualitative metrics with which the collected data can be compared, or otherwise analyzed, the type of data, such as, for example, whether the data is numeric or textual, and the relative order, within the job file, of the data.

At step 325, derivative rows that are aggregates of child rows can be constructed. As indicated previously, the derivation of data for inclusion into derivative rows can be based on the metadata that was collected at step 320. For example, the metadata collected at step 320 can be utilized to identify multiple iterations of the same assessment utilizing the same parameters within a single job file. Those multiple iterations can then be aggregated into a derivative row at step 325. Additionally, the meta-data that was collected at step 320 can inform the manner of that aggregation. For example, as indicated previously, if the metadata collected at step 320 indicates that the data values are textual, then the aggregation performed at step 325, in order to construct derivative rows, can be a concatenation of those textual values, or a determination that all the textual values are the same and, thus, can comprise merely a single one of those textual values. As another example, if the metadata collected at step 320 indicates that the data values are numeric, then the aggregation performed at step 325, in order to construct derivative rows, can be a selection of a median value, or can be a summation of the data values. The precise manner of the aggregation of, for example, numeric values can also be informed by the metadata collected at step 320. For example, among the metadata collected at step 320 can be notes or other indicators provided, either by a user that executed the assessment that collected that data, or by the assessment author themselves. Such indicators can be referenced to determine whether a summation, an average, a median value, or another mathematical operation would provide the most meaningful aggregate value.

At step 330, a determination can be made as to whether the user specified any further groupings. If the user did specify groupings, at step 330, then further, higher-level derivatives can be constructed based upon those groupings at step 335. More specifically, at step 330, the assessment results viewer can enable a user to group data according to various commonalities. For example, a user can be allowed to group iterations of assessments that are all directed to a common evaluation, such as, for example, an evaluation of the memory throughput of a computing device, or the graphics capability of a computing device. The user can also be allowed to group data across multiple job files. For example, each job file can represent a series of assessments that were executed on a computing device. The multiple job files can, therefore, represent that series of assessments as executed on multiple computing devices. In such a case, the user can be allowed to group iterations of assessments across those job files to, for example, aggregate graphics-centric assessments, or processor-centric assessments, across all of the computing devices.

If the user specified groupings, at step 330, then, at step 335, further derivatives can be constructed based upon those groupings. For example, if the user grouped a series of assessments whose collected data comprised numerical values, a derivative value representing an aggregate of those groupings can be constructed by, for example, summing those numerical values together, or, alternatively, selecting a median value. As before, the aggregation of values, such as that performed at step 335, can be based on the metadata, obtained at step 320, associated with the data being grouped.

If, at step 330, the user did not group any assessments, across one or more job files, together, then processing can proceed with step 340, at which point a determination can be made as to whether there were multiple job files selected at step 310. If, at step 340, it is determined that multiple job files were selected, then, at step 345, a comparison context can be built to enable comparisons between like iterations of assessments across the multiple job files. For example, as indicated previously, iterations of assessments across multiple job files can be compared if the assessments that were executed to collect the data were of the same version and utilized the same parameters. Alternatively, references to other metadata can be made to identify iterations of assessments across multiple job files that can be compared including, for example, a reference to the relative location, within the job file, or other contextual information. At step 345, a determination of those iterations of assessments that can be compared can be made, and those iterations of assessments, or derivative values based thereon, can be displayed in a manner through which they are easy to compare, such as, for example, by being displayed in the same row. If, at step 345, it is determined that iterations are similar, but differ slightly, such as, for example, due to a variation in version numbers of the assessment, the comparison context that is built at step 345 can position the values obtained from, or derived from, such slightly differing iterations proximate to one another when those values are displayed, such as at step 350.

If it is determined, at step 340, that multiple job files were not selected, or, alternatively, if, at step 340, it was determined that multiple job files were selected, and, at step 345, a comparison context was built, then, at step 350, the data can be displayed along with actionable information, if applicable. For example, as indicated previously, the display, at step 350, can initially be of aggregate values, or other like simplifications, that can have been constructed at step 325, or step 335, if applicable. In such a manner, the user can be initially presented with an overview from which the user can obtain more detailed information, including the raw data, if the user so desires. The display that is generated at step 350 can include the comparison context that was constructed at step 345 to enable easy comparison between multiple job files. Additionally, the display, at 350, can include qualitative analysis to the extent that the metadata, obtained at step 320, provides any such guidance. For example, if the metadata, obtained at step 320, indicated a range of acceptable values for the data collected by a particular assessment, then, at step 350, the displayed data can include an indication that is within a range of acceptable values, such as, for example, through color coding or other like indicators. The metadata, obtained in step 320, can also indicate defined ranges, such as a typical "high", "medium" and "low" range of values. In such a case, the display of the data, at step 350, can utilize multiple color codings, or other like indicators, to indicate which range of values the displayed data falls within. Alternatively, as indicated previously, the display of the data at step 350 can be made with reference to per-determined or dynamically determined benchmarks. In such a case, the display of the data, at step 350, can indicate whether a value has "passed" or "failed" a particular benchmark or other threshold.

The metadata, obtained at step 320, or the comparisons built at step 345, can reveal a potentially sub-optimal situation or condition. For example, such information can reveal that the data collected by an assessment directed to the startup of a computing device indicates that the computing device is starting too slowly. In such a case, the display, at step 350, can further comprise actionable information that can either provide guidance to the user as to potential mechanisms that can alleviate the perceived sub-optimal condition, or that can otherwise provide further information relevant to such a condition. For example, in the case where the collected data indicates that the computing device is starting too slowly, actionable information can include information regarding the sequence of steps that are performed, by the computing device, at start up, a listing of the software modules that are loaded at start up, or specific directives to deactivate one or more software modules, or other startup-centric elements as a means by which the start of performance of the computing device can be improved. In addition, as indicated previously, existing analysis tools can be utilized to provide further information to the user. Such analysis tools can be provided access to, for example, the raw assessment data through defined interfaces that are adhered to by both the assessment viewer and the analysis tools.

In one embodiment, the functionality of enabling a user to group multiple assessments, including assessments across job files, together can enable the user to focus on a particular set of data as part of the display of the data at step 350. For example, as illustrated in FIG. 2, data can be presented in a tabular form, with individual job files being presented along a series of columns, and individual iterations of assessments, and derivatives thereof, being presented along a series of rows. However, in one embodiment, the user can be allowed to pivot such a tabular presentation along different axis. For example, if the user had grouped the data collected in accordance with various subsystems on a computing device, an initial presentation of the data, at step 350, can comprise each of the various subsystems being presented along a series of columns, in each of the multiple computing devices whose job files are being compared being presented along a series of rows. The user can then be allowed to pivot such a presentation to compare different types of, for example, graphics subsystem hardware. In such a case, information that may have initially been presented along a series of rows can now be presented as a series of columns, with each compared graphics subsystem hardware being presented as a different column, while the rows can remain a listing of the individual assessments that collected the data.

At step 355, after the data from the job files selected at step 310 has been displayed at step 350, a determination can be made as to whether the user wishes to compare yet further job files. If, at step 355, it is determined that the user does wish to compare additional job files, processing can return to step 310 and the user can be allowed to select yet more job files to view and compare. Conversely, if, at step 355, it is determined that the user does not wish to compare any additional job files, the relevant processing can end at step 360.

As can be seen from the above descriptions, mechanisms for presenting the results of assessments have been enumerated. In view of the many possible variations of the subject matter described herein, we claim as our invention all such embodiments as may come within the scope of the following claims and equivalents thereto.

We claim:

1. One or more computer-readable storage media comprising computer-executable instructions for displaying assessment results obtained by assessments that quantify a performance of an aspect of a computing device, the computer-executable instructions directed to steps comprising:
   obtaining, from at least one job file, assessment data collected by iterations of assessments and assessment metadata;
   de-serializing the assessment data from the order in which the assessment data was collected in the at least one job file;
   identifying, within a single job file, multiple equivalent iterations of a first assessment performed with a first set of parameters, wherein the identifying comprises identifying an iteration of a second assessment as being one of the multiple equivalent iterations of the first assessment based on an identifier and a version number of the second assessment matching an identifier and a version number the first assessment; and wherein further the assessment metadata comprises the identifier and the version number of both the first and the second assessments;
   aggregating, in accordance with the assessment metadata, assessment data collected by the identified multiple equivalent iterations;
   generating at least one derivative row comprising the aggregated assessment data; and
   generating a tabular presentation of the assessment data comprising the at least one derivative row as an overview of the assessment data collected by the identified multiple equivalent iterations, the tabular presentation being extendable to further also comprise the assessment data collected by the identified multiple equivalent iterations.

2. The computer-readable storage media of claim 1, wherein the computer-executable instructions for aggregating the assessment data collected by the identified multiple equivalent iterations comprise computer-executable instructions for selecting, as the aggregated assessment data, a median of the assessment data collected by the identified multiple equivalent iterations; and wherein further the assessment metadata indicates that the assessment data collected by the identified multiple equivalent iterations comprises numeric data for which the overview can be generated by selecting the median of the assessment data collected by the identified multiple equivalent iterations.

3. The computer-readable storage media of claim 1, wherein the computer-executable instructions for aggregating the assessment data collected by the identified multiple equivalent iterations comprise computer-executable instructions for performing an AND operation on the assessment data collected by the identified multiple equivalent iterations; and wherein further the assessment metadata indicates that the assessment data collected by the identified multiple equivalent iterations comprises Boolean data for which the overview can be generated by performing the AND operation on the assessment data collected by the identified multiple equivalent iterations.

4. The computer-readable storage media of claim 1, wherein the computer-executable instructions for aggregating the assessment data collected by the identified multiple equivalent iterations comprise computer-executable instructions for concatenating the assessment data collected by the identified multiple equivalent iterations; and wherein further the assessment metadata indicates that the assessment data collected by the identified multiple equivalent iterations comprises textual strings for which the overview can be generated by performing the concatenation operation on the assessment data collected by the identified multiple equivalent iterations.

5. The computer-readable storage media of claim 1, wherein the computer-executable instructions for generating the tabular presentation comprise computer-executable instructions for ordering, proximate to the at least one derivative row, a row comprising data from the second assessment if the identifier of the first assessment is equivalent to the identifier of the second assessment, but the version number of the first assessment is different from the version number of the second assessment.

6. The computer-readable storage media of claim 1, wherein the computer-executable instructions for generating the tabular presentation comprise computer-executable instructions for matching equivalent iterations of the first assessment performed with the first set of parameters across multiple job files and displaying the assessment data from the matched equivalent iterations in a same row, the assessment data from each of the multiple job files being displayed in a column associated with that job file.

7. The computer-readable storage media of claim 6, wherein at least some of the multiple job files comprise assessment data collected from multiple computing devices.

8. The computer-readable storage media of claim 1, comprising further computer-executable instructions for: receiving an indication of a user grouping of assessments; further aggregating, in accordance with the assessment metadata, assessment data collected by iterations of the user grouped assessments; and generating at least one further, higher-level derivative row comprising the further aggregated assessment data.

9. The computer-readable storage media of claim 8, wherein the computer-executable instructions for generating the tabular presentation comprise computer-executable instructions for pivoting the table in accordance with a selected grouping from among the user groupings.

10. The computer-readable storage media of claim 1, wherein the computer-executable instructions for generating the tabular presentation comprise computer-executable instructions for providing, based on the assessment metadata, a qualitative indicator for the assessment data; wherein further the assessment metadata comprises qualitative delineations of the assessment data.

11. The computer-readable storage media of claim 1, comprising further computer-executable instructions for generating actionable information associated with a sub-optimal condition indicated by the assessment data.

12. A method for generating a display of assessment results obtained by assessments that quantify a performance of an aspect of an assessed computing device, the method comprising the steps of: obtaining, on a computing device, from at least one job file, computer-readable assessment data collected by iterations of assessments and computer-readable assessment metadata;
  de-serializing, with the computing device, the assessment data from the order in which the assessment data was collected in the at least one job file;
  identifying, using the computing device, within a single job file, multiple equivalent iterations of a first assessment performed with a first set of parameters, wherein the identifying comprises identifying an iteration of a second assessment as being one of the multiple equivalent iterations of the first assessment based on an identifier and a version number of the second assessment matching an identifier and a version number of the first assessment; and wherein further the assessment metadata comprises the identifier and the version number of both the first and the second assessments;
  aggregating, with the computing device, in accordance with the assessment metadata, assessment data collected by the identified multiple equivalent iterations;
  generating, with the computing device, at least one derivative row comprising the aggregated assessment data; and
  generating, on a display device communicationally coupled to the computing device, a tabular presentation of the assessment data comprising the at least one derivative row as an overview of the assessment data collected by the identified multiple equivalent iterations, the tabular presentation being extendable to further also comprise the assessment data collected by the identified multiple equivalent iterations.

13. The method of claim 12, wherein the generating the tabular presentation comprises matching equivalent iterations of the first assessment performed with the first set of parameters across multiple job files and displaying the assessment data from the matched equivalent iterations in a same row, the assessment data from each of the multiple job files being displayed in a column associated with that job file.

14. The method of claim 12, wherein the generating the tabular presentation comprises providing, based on the assessment metadata, a qualitative indicator for the assessment data; wherein further the assessment metadata comprises qualitative delineations of the assessment data.

15. The method of claim 12, further comprising the steps of generating actionable information associated with a sub-optimal condition indicated by the assessment data.

16. A system comprising:
  multiple computing devices, each having had executed thereon assessments that quantified a performance of an aspect of a computing device, from among the multiple computing devices, on which they were executed; and
  One or more computer-readable media comprising computer-executable instructions for displaying assessment results obtained by the assessments, the computer-executable instructions directed to steps comprising:
    obtaining, from multiple job files, assessment data collected by iterations of assessments and assessment metadata, wherein each of the multiple computing devices has at least one job file, from among the multiple job files, associated with it;
    de-serializing the assessment data from the order in which the assessment data was collected in the multiple job files;
    identifying, within a single job file, multiple equivalent iterations of a first assessment performed with a first set of parameters, wherein the identifying comprises identifying an iteration of a second assessment as being one of the multiple equivalent iterations of the first assessment based on an identifier and a version number of the second assessment matching an identifier and a version number of the first assessment; and wherein further the assessment metadata comprises the identifier and the version number of both the first and the second assessments;
    aggregating, in accordance with the assessment metadata, assessment data collected by the identified multiple equivalent iterations;
    generating at least one derivative row comprising the aggregated assessment data; and
    generating a tabular presentation of the assessment data comprising the at least one derivative row as an overview of the assessment data collected by the identified multiple equivalent iterations and comprising a column for each of the multiple job files, the tabular presentation being extendable to further also comprise the assessment data collected by the identified multiple equivalent iterations.

17. The system of claim 16, wherein the one or more computer-readable media comprise further computer-executable instructions for: receiving an indication of a user grouping of assessments; further aggregating, in accordance with the assessment metadata, assessment data collected by iterations of the user grouped assessments; and generating at least one further, higher-level derivative row comprising the further aggregated assessment data.

18. The system of claim 17, wherein the user grouping of assessments is in accordance with subsystems of the multiple computing devices; and wherein further the computer-executable instructions for generating the tabular presentation comprise computer-executable instructions for pivoting the table so as to comprise columns directed to the subsystems and rows directed to the multiple computing devices.

19. The computer-readable storage media of claim 1, wherein the identifier and the version number are both embodied by a single metadata.

20. The method of claim 12, wherein the identifier and the version number are both embodied by a single metadata.

* * * * *